United States Patent
Agarwal et al.

(10) Patent No.: US 12,223,253 B2
(45) Date of Patent: Feb. 11, 2025

(54) DYNAMIC COPYFITTING PARAMETER ESTIMATION

(71) Applicant: Adobe Inc., San Jose, CA (US)

(72) Inventors: Rishav Agarwal, Siliguri (IN); Vidisha Rama Hegde, Belgaum (IN); Vasu Gupta, Sirhind (IN); Sanyam Jain, New Delhi (IN)

(73) Assignee: Adobe Inc., San Jose, CA (US)

( * ) Notice: Subject to any disclaimer, the term of this patent is extended or adjusted under 35 U.S.C. 154(b) by 82 days.

(21) Appl. No.: 17/984,143

(22) Filed: Nov. 9, 2022

(65) Prior Publication Data
US 2024/0152680 A1 May 9, 2024

(51) Int. Cl.
G06F 17/00 (2019.01)
G06F 40/103 (2020.01)

(52) U.S. Cl.
CPC .................. *G06F 40/103* (2020.01)

(58) Field of Classification Search
CPC .................................................. G06F 40/103
See application file for complete search history.

(56) References Cited

U.S. PATENT DOCUMENTS

| | | | | |
|---|---|---|---|---|
| 8,127,244 B2* | 2/2012 | Oh | ...................... | G06F 3/04895 715/780 |
| 8,478,352 B2* | 7/2013 | Vymenets | ......... | H04M 1/72436 455/412.2 |
| 8,521,136 B2* | 8/2013 | Riddle | ................. | G06Q 10/107 455/414.4 |
| 8,521,143 B2* | 8/2013 | Balasubramaniam | .. | H04W 4/12 455/414.4 |
| 9,213,681 B2* | 12/2015 | Sorotokin | ............. | G06F 40/103 |
| 2005/0223320 A1* | 10/2005 | Brintzenhofe | ........ | G06F 40/174 715/253 |

(Continued)

OTHER PUBLICATIONS

"Copyfitting", Retrieved from <https://draftingmanuals.tpub.com/14066/css/Copyfitting-44.htm>, retrieved on Jul. 21, 2023, pp. 1-3.

(Continued)

*Primary Examiner* — Mohammed H Zuberi
(74) *Attorney, Agent, or Firm* — Nicholson De Vos Webster & Elliott LLP

(57) ABSTRACT

Embodiments are disclosed for real-time copyfitting using a shape of a content area and input text. A content area and an input text for performing copyfitting using a trained classifier is received. A number of remaining characters in the content area is computed in real-time using the input, the computing performed in response to receiving additional input text, wherein computing, in real-time, the number of remaining characters in the content area using the input text includes generating, by the trained classifier, a set of weights including a first set of one or more weights for the input text and a second set of one or more weights for the content area. The first set of one or more weights, the second set of one or more weights, the input text, and the additional input text, and a copyfitting parameter indicating a number of additional characters to be fitted into the content area are determined based on the content area. The copyfitting parameter and the number of remaining characters are presented in real-time.

20 Claims, 10 Drawing Sheets

(56) References Cited

U.S. PATENT DOCUMENTS

| | | | | |
|---|---|---|---|---|
| 2006/0117255 | A1* | 6/2006 | Seeler | G06F 40/106 715/252 |
| 2006/0156232 | A1* | 7/2006 | Giannetti | G06F 40/174 715/234 |
| 2007/0124704 | A1* | 5/2007 | Oh | G06F 3/04895 715/201 |
| 2008/0282147 | A1* | 11/2008 | Schorr | G06F 40/106 706/19 |
| 2009/0085921 | A1* | 4/2009 | Do | G09G 5/14 345/543 |
| 2009/0319888 | A1* | 12/2009 | Oygard | G06F 40/189 715/252 |
| 2012/0079371 | A1* | 3/2012 | Tsai | G06F 40/103 715/246 |

OTHER PUBLICATIONS

"Editing & Fitting Copy: If it doesn't fit you must edit", Chapters 5-6, CopyEditing, pp. 1-5.

Python Software Foundation, "font-line • PyPI", available online at <https://pypi.org/project/font-line/>, Nov. 16, 2020, 11 pages.

Python Software Foundation, "fonttools • PyPI", available online at <https://pypi.org/project/fonttools/>, 2023, 85 pages.

Wikipedia, "Principal component analysis", available online at <https://en.wikipedia.org/wiki/Principal_component_analysis, Jul. 21, 2023, 34 pages.

Wikipedia, "Support vector machine", available online at <https://en.wikipedia.org/wiki/Support_vector_machine>, Jul. 21, 2023, 13 pages.

* cited by examiner

DYNAMIC COPYFITTING PARAMETER ESTIMATION

BACKGROUND

In electronic documents, creating layouts of content within available space is a difficult task often requiring iterations of changes between a designer and an editor. Copyfitting is a process of fitting a specific amount of content into the available space. The editor analyzes the content and any remaining available space to determine if the amount of content (e.g., text characters) is suitable for the available space or if content should be added or removed to optimize a perceptual characteristic of the content.

SUMMARY

Introduced here are techniques/technologies that relate to dynamically estimating copyfitting parameters for electronic documents. In some embodiments, a copyfitting estimation system computes a copyfitting parameter using a content area and input text. To compute the copyfitting parameter, a content area and input text to the content area are received through a user interface. The content area is selected using a user interface of a document publishing system. A set of weights are applied to features of the input text and the content area to compute the remaining characters, words, or lines in real-time as input text is being received. To generate the set of weights, for each existing shape of a content area, a classifier is trained to learn a relative importance of various perceptual aspects of the input text and dimension features of the content area. A perceptual aspect of the input text includes a typeface, a font size, and spacing between lines of font. A dimension feature of the content area includes height, width, shape, and any additional information that defines the shape such as minimum width or maximum width. Each trained classifier generates a set of weights that are associated with a different shape of the content area (e.g., square, triangle, irregular shape). After identifying the shape of the content area selected in the user interface, the corresponding set of weights generated by the classifier associated with the shape is selected. The selected set of weights are then applied to the input text and the content area to predict a number of characters, words, or lines available for additional content.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
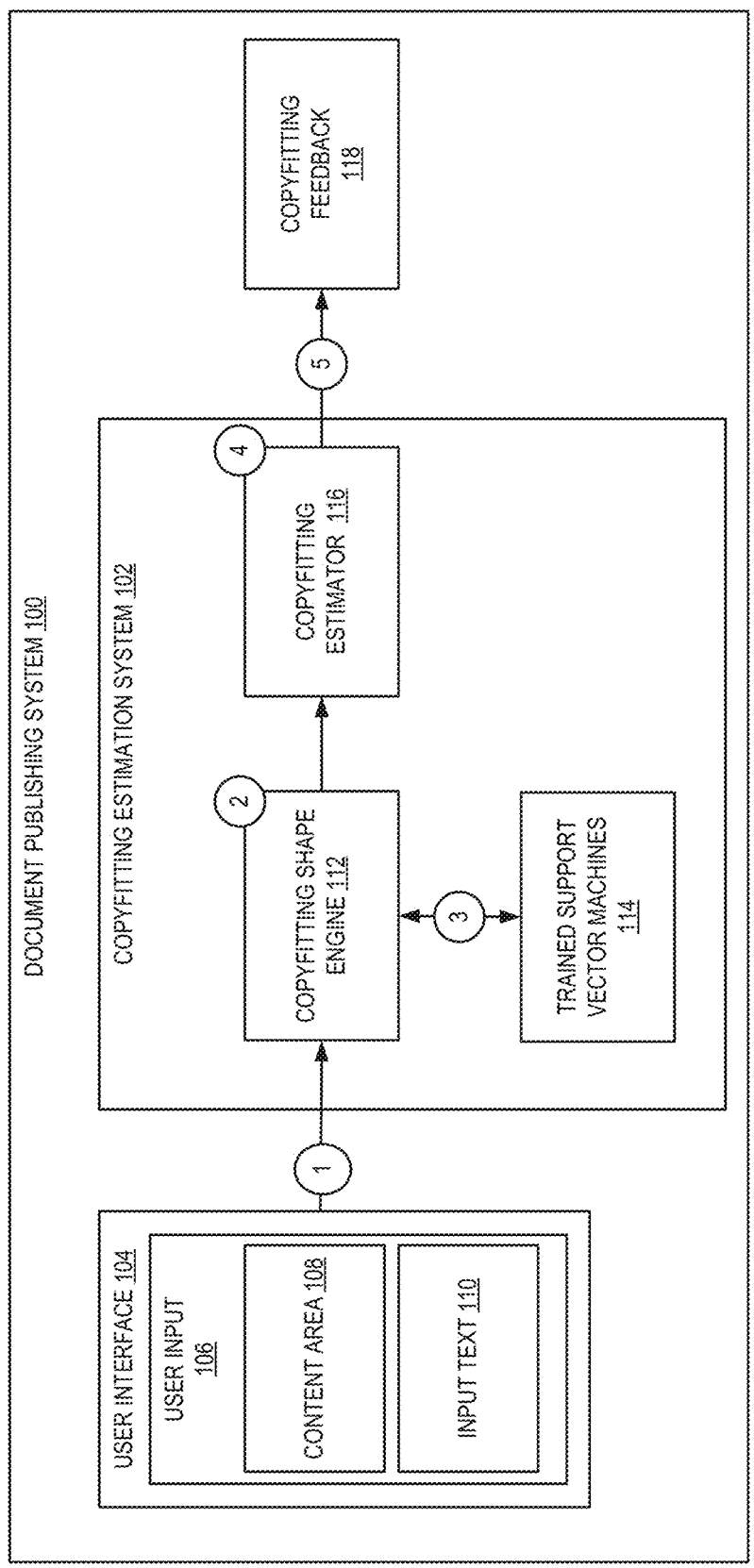
FIG. 1 illustrates a diagram of a process of dynamically estimating copyfitting parameters for electronic documents in accordance with one or more embodiments.

One or more embodiments of the present disclosure includes a copyfitting estimation system that performs copyfitting. For example, a trained classifier can be used to compute a number of remaining characters that can be fit into a given area of an electronic document. Copyfitting of electronic documents presents challenges as layouts of content can change multiple times during the content generation and publication process. As content publication applications increasingly become in-browser applications, the ability to provide real-time feedback on content input through the in-browser application is computationally challenging. Additionally, the wide variety of devices that can execute in-browser applications have a wide range of processor capabilities and some hardware limitations can make performing complex calculations difficult.

Existing techniques include using application programing interfaces (APIs) that request a server to calculate copyfitting parameters. However, performing these calculations using a backend creates substantial delay in the design process and is a complex calculation that requires performing a full document composition for each request. As a result, the content design and publication process using the existing approaches suffers a loss of productivity and flexibility in design. Additionally, existing systems use complex calculations often using remote server architectures and are thus unable to provide timely feedback to designers using an in-web application to perform content layout and publishing.

In some other existing techniques, some electronic documents predetermine a number of characters that can be added to a field or content area. Using these techniques, the copyfitting information is not predicted, instead, the system merely deducts a number of characters that have already been input by the user from the predetermined number. As such, these approaches lack the ability to provide real-time copyfitting parameter feedback for an in-browser design application.

To address these and other deficiencies in existing systems, embodiments use a machine learning model to determine copyfitting parameters in real-time. For example, a classifier is trained to compute a set of weights that represent relative importance of features of input text and the content area after being trained to classify at content area as underfit or overfit. Once the set of weights has been computed, a predicted number of characters for a shape that includes input text can be generated. In some embodiments the classifier is a machine learning model that is trained to filter new data into categories (e.g., overfit or underfit). In some embodiments, the classifier is implemented using a support vector machine. A support vector machine is a supervised learning machine learning model that classifies data into categories and identifies a boundary condition between different categories. While some embodiments are described herein with respect to using support vector machines, in various embodiments alternative supervised machine learning models can be used.

Embodiments receive input text for insertion into a content area of an electronic document and compute a number of remaining characters available to be inserted into the content area in real-time. Typically, a user would have to perform a full composition process for each line using a computationally complex algorithm to determine the copyfit. However, the full composition process can be extremely challenging for long documents or documents with multiple content areas being edited in a collaborative in-web application simultaneously. By using support vector machines to compute a set of weights, a lightweight calculation can be performed in real-time providing the users with immediate feedback on the copyfit of the text layout in the content area.

FIG. 1 illustrates a diagram of a process of dynamically estimating copyfitting parameters for electronic documents in accordance with one or more embodiments. As depicted in FIG. 1, a document publication system 100 includes a copyfitting estimation system 102. The copyfitting estimation system includes a copyfitting shape engine 112, trained support vector machines 114 and a copyfitting estimator 116. In some embodiments, the copyfitting estimation system 102 is implemented as a module in an in-browser document content design application or another computing application. In some embodiments, the trained support vector machines 114 are supervised machine learning models that are used for classifying data.

At numeral 1, the copyfitting estimation system 102 obtains a user input 106. The user input 106 includes a selection of a content area 108 and input text 110. The selection of the content area 108 identifies a content area of an electronic document that has been selected for editing by the user via the user interface 104. The input text 110 is a real-time stream of letters or characters that are input to the user interface 104 by the user. For example, the content area 108 is a portion of a page of the electronic document that is available to add text or characters. In some embodiments, the selection of the content area 108 identifies the content area that is a square, triangle, circle, ellipse, or a freeform shape.

At numeral 2, the copyfitting shape engine 112 classifies the shape of the content area 108. For instance, the copyfitting shape engine 112 compares the content area 108 to a database of existing shapes to determine a matching shape for the content area. In some embodiments, the copyfitting shape engine 112 is a trained classifier that generates a similarity between a set of candidate shapes and the content area 108. The set of candidate shapes includes a predetermined set of shapes for which a corresponding trained support vector machine has been trained. In an example, if the content area 108 is a user defined area that is similar to a triangle, the copyfitting shape engine 112 retrieves a set of weights from the trained support vector machines 114 that correspond to the triangle shape.

At numeral 3, the copyfitting shape engine 112 requests a set of weights from the trained support vector machines 114 using the shape of the content area 108 as described at numeral 2. The trained support vector machines 114 includes multiple trained support vector machines. Each of the trained support vector machines 114 is trained to compute a set of weights for a different shape. For instance, a first support vector machine is trained to compute a first set of weights for a square shaped content area while a second support vector machine is trained to compute a second set of weights for a triangle shaped content area. Additional details of the trained support vector machines 114 are described regarding FIG. 2.

Additionally at numeral 3, the copyfitting shape engine 112 receives the set of weights from the trained support vector machines 114 based on the shape of the content area 108. The copyfitting shape engine 112 provides the set of weights to the copyfitting estimator 116. In an example, the set of weights represent a relative importance of a typographic parameter with regard to the number of remaining characters that can be copyfit into the content area 108. For example, typographic parameters of the input text include character height, character width, total width of the input text, and portion of the content area 108 covered by the input text.

As described in additional detail below regarding FIG. 2, during the training process, the trained support vector machines receive input parameters such as area covered by input text, total area of the content area, total width of characters in the input text, a number of characters in the input text, a number of words in the input text, a height of the shape, a minimum width of the shape, and a maximum width of the shape. In some embodiments, the area covered by input text is computed using line composition. Line composition includes estimating an area covered by the text on each line. The total area covered is then estimated using the shape of the content area and the aggregation of the line compositions.

Each support vector machine receives a training shape with training input text and is trained to determine if the shape is underfit (e.g., more characters can be added to the shape), properly fit (e.g., the number of characters is optimized for the shape), or overfit (e.g., the number of characters is too high for the shape). The support vector machine receives feedback that represents a ground truth condition (e.g., overfit, underfit). Using the feedback, the support vector machine adjusts a weight to each of the input parameters for use in a subsequent prediction. After the support vector machine accurately computes the underfit or overfit condition, the weights are stored and associated with the shape of the content area.

At numeral 4, the copyfitting estimator 116 computes a number of remaining characters in the content area 108 using the set of weights and the input text. For instance, as characters are input to the user interface 104, the copyfitting estimator applies the weights to typography parameters of the input text. Continuing with the example above, the set of weights are applied to the typographic parameters of the input text to determine a number of remaining characters in the content area. For example, the set of weights $[\theta_1, \theta_2 \ldots \theta_n]$ can be applied to features such as minimum and maximum width of the content area, content area height, area of the content area, number of characters in an input text $c_{in}$, a number of words in the input text $w_{in}$, an area covered by the input text $a_{in}$, and a sum of the widths of characters in the input text $d_{in}$. An example calculation is represented by the equation below.

$$r = \begin{bmatrix} \text{Min frame width } \theta_1 + \text{Max frame width } \theta_2 + \text{Frame height } \theta_3 + \\ \text{Total frame area } \theta_4 + C_{in}\theta_5 + W_{in}\theta_6 + A_{in}\theta_7 + D_{in}\theta_8 + \theta_9 \\ \theta_5 + (1/6)\theta_6 + (Av\,char\text{ width}*\text{line height})\theta_7 + (Av\,char\text{ width})\theta_8 \end{bmatrix}$$

At numeral 5, the copyfitting estimator 116 outputs copyfitting feedback to a presentation device, such as by the user interface. The copyfitting feedback includes an annotated visual presentation of the content area, the input text, and remaining characters, words, or lines available in the content area for additional input text.

Figure 2:
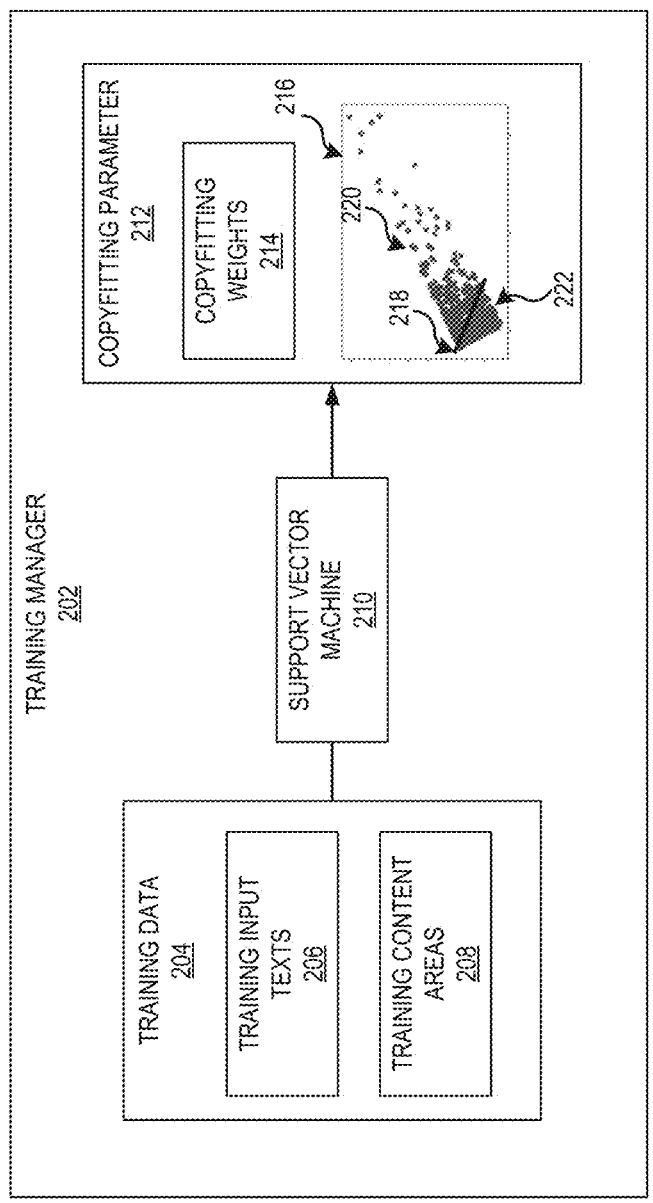
FIG. 2 illustrates a diagram of a process of training a support vector machine for computing copyfitting parameters in accordance with one or more embodiments.

FIG. 2 illustrates a diagram of a process of training a support vector machine for computing copyfitting parameters in accordance with one or more embodiments. In various embodiments, training is performed using tagged data, such as labeled examples of underfit or overfit content areas, to train the model to classify a training content area with training input text as underfit or overfit. The classification is performed by learning, using the tagged data, a boundary between overfit and underfit for a shape of the content area. In some embodiments, the boundary can be linear or a curve depending on the tagged data. The training manager 202 uses training data 204 to build a model that is trained to assigned new content areas and input texts to an overfit or underfit classification.

The training manager 202 can include, or have access to, training input texts 206 and training content areas 208. The training input texts 206 may text content having various lengths, and variations in font size, typeface, spacing, and other typographic parameters. The training content areas 208 include a library of shapes that are available for insertion of text content during a document publication process. For example, the training content areas can include a set of shapes used in common document layouts, and can include shapes that are received from a user, such as in a shared content library. To generate the training input texts 206, a text content area having fixed dimensions is created and an initial text with varied font and font properties is inserted into the text content area. The initial text is extracted from a dataset of documents that include text content. To generate the training content areas, a shape is chosen from existing geometric shapes (e.g., square, triangle ellipse), or defined by a user of the training manager 202 to accommodate irregular or custom designed shapes.

In some embodiments, the training manager 202 can insert each of the training input texts 206 into each of the training content areas 208 and provide the content area including the input text to the support vector machine. During training, a label of underfit or overfit for the content area and input text is also provided to the support vector machine 210. The support vector machine 210 generates a classification of the content area and receives feedback of the label to determine an accuracy of the decision. At the completion of the training process, the support vector machine 210 generates an aggregate classification 216 that illustrates the boundary 218. The boundary 218 illustrates the separation between the underfit content area 222 below the boundary 218 and the overfit content area 220 above the boundary 218. After the boundary 218 is determined, the support vector machine can compute copyfitting weights 214 that represent a relative importance of features learned during training that generate the boundary 218. The copyfitting weights, as described above, can be used after training to predict a number of remaining characters in the content area.

Figure 3:
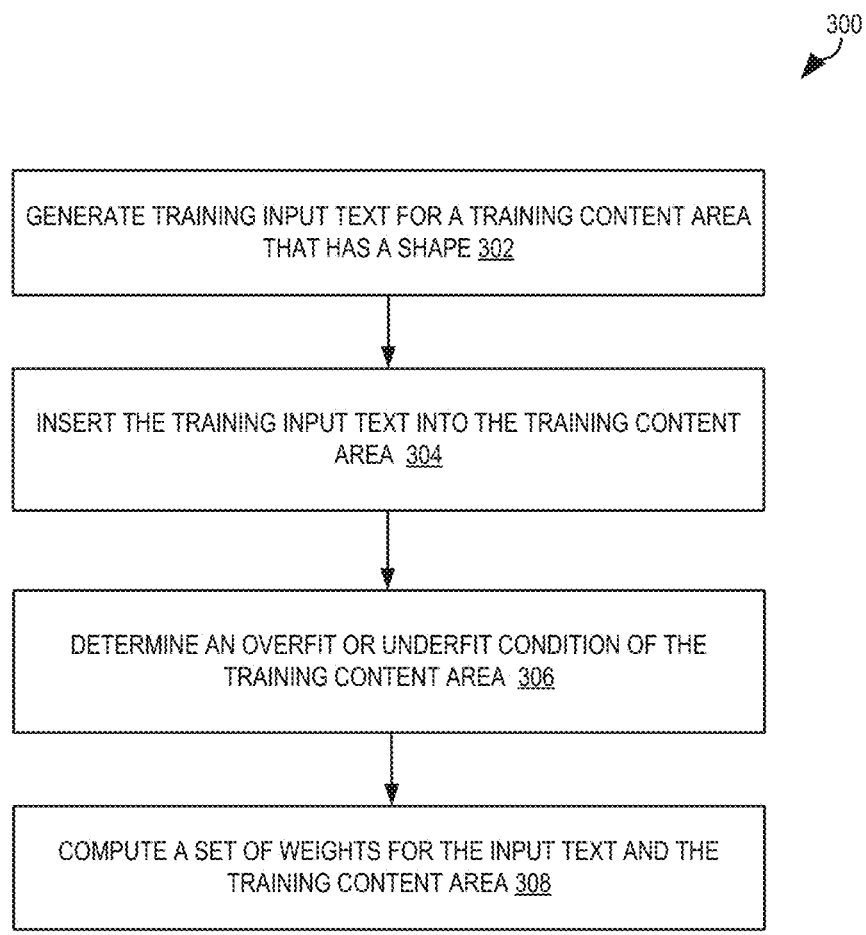
FIG. 3 illustrates a flowchart of a series of acts in a method of training a support vector machine to perform copyfitting in accordance with one or more embodiments in accordance with one or more embodiments.

FIG. 3 illustrates a flowchart of a series of acts in a method of training a support vector machine to perform copyfitting in accordance with one or more embodiments in accordance with one or more embodiments. In one or more embodiments, the method 300 is performed in a digital medium environment that includes the copyfitting estimation system 102 or the training manager 202. The method 300 is intended to be illustrative of one or more methods in accordance with the present disclosure and is not intended to limit potential embodiments. Alternative embodiments can include additional, fewer, or different steps than those articulated in FIG. 3.

As illustrated in FIG. 3, the method 300 includes an act 302 of generating training input text, such as training input text 206 of FIG. 2, for a training content area, such as training content area 208 of FIG. 2, that has a shape. In an example, the training manager 202 receives a training content area that is defined by the shape of a triangle. The training manager 202 generates input text that includes one or more characters, words, or symbols for insertion into the training content area. In some embodiments, the training manager generates a predetermined length of training input text.

As illustrated in FIG. 3, the method 300 includes an act 304 of inserting the training input text into the training content area. Returning to the previous example, the training manager inserts each of the characters of the training input text into the boundaries of the triangle shape. In some embodiments, the training manager 202 receives a training content area that includes a number of characters that have been labeled as properly fit using scripts executed by a different text composition application. To form a set of training content areas, the training manager 202 generates additional input text for some properly fit training content areas (e.g., making ground truth overfit training content areas) and removes some input text for other properly fit training content areas (e.g., making ground truth underfit training content areas).

As illustrated in FIG. 3, the method 300 includes an act 306 of determining if the training content area has an underfit or overfit condition. As described above, an underfit content area is a content area that can receive additional characters. Returning to the previous example, the support vector machine determines if the training content area has additional space for one or more additional characters. As described above, an overfit content area is an area that contains an excess number of characters that degrades the perceptual appearance of the text. Returning to the previous example of the training input text and the triangle shape, the support vector machine determines that the triangle is overfit with input text and one or more character of the input text can be removed to produce a more optimal fit.

In some embodiments, the training content area is properly fit when a single additional character causes the training content area to change from underfit to overfit. During training the support vector machine will predict an underfit or overfit for a given input text and training content area. The method 300 proceeds provide the support vector machine with training content areas that include varied numbers of words or characters. The support vector machine receives feedback indicating an accuracy of the prediction in comparison to a ground truth condition. For instance, if the support vector machine predicts overfit and the ground truth condition is underfit, then the support vector machine will adjust the set of weights in response to the feedback to improve a subsequent prediction. In some embodiments, the support vector machine stores the weights that generate accurate predictions in comparison with the ground truth conditions.

Figure 4:
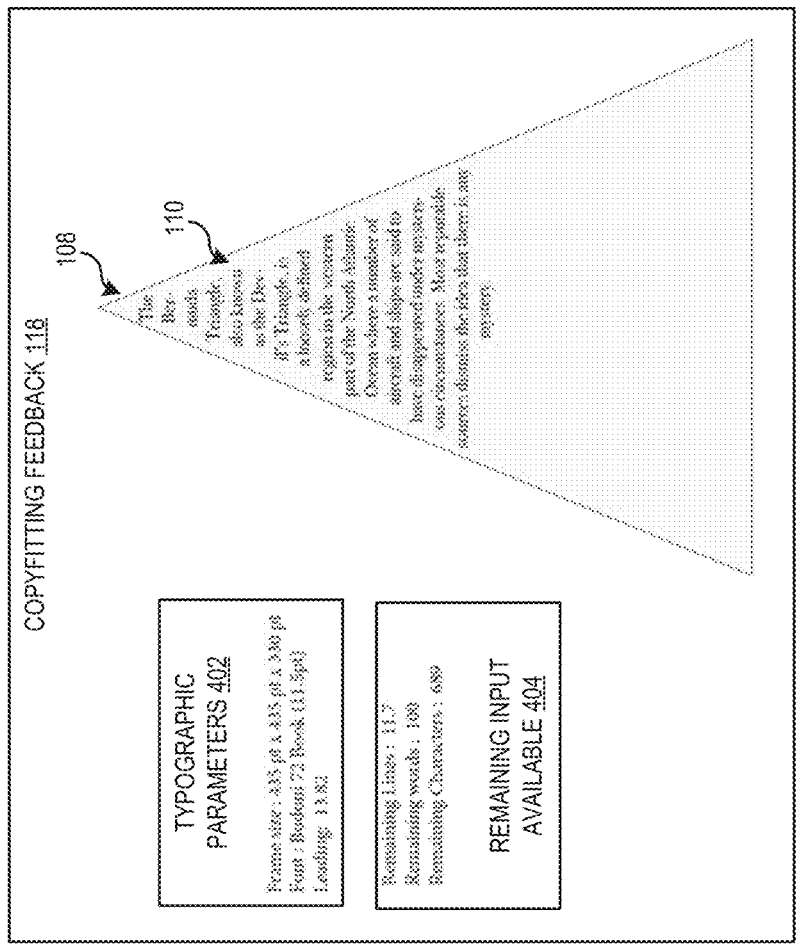
FIG. 4 illustrates an example of experimental results with varying typographic parameters of the text and content area in the electronic document in accordance with one or more embodiments.

FIG. 4 illustrates an example of copyfitting feedback generated in response to input text into a content area in accordance with one or more embodiments. As described above, the copyfitting feedback 118 can be output by the copyfitting estimation system 102 to a user interface or presentation device. As illustrated in FIG. 4, the copyfitting feedback 118 includes the content area 108, the input text 110, typographic parameters 402, and remaining input available 404. For example, as described above, the copyfitting feedback includes the remaining input available 404 that includes remaining lines, remaining words, and remaining characters that can be input into the content area 108. The typographic parameters 402 represent features of the input text 110 such as a content area size, font name, font size, and a vertical spacing between lines (i.e., leading as illustrated in FIG. 4).

In some embodiments, the copyfitting feedback 118 is presented continuously as the user interface is receiving user inputs such as additional input text. As described above, the copyfitting estimation system 102 updates the copyfitting feedback 118 in real-time to reflect all input text 110 added to the content area 108.

Figure 5:
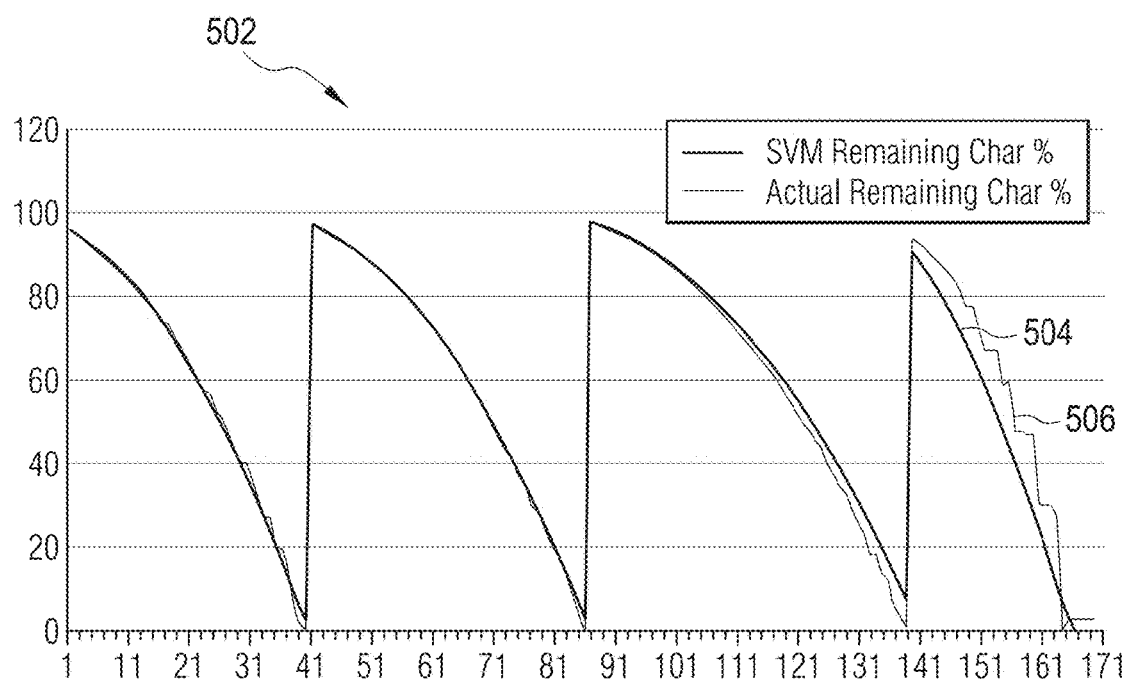
FIG. 5 illustrates an additional example of experimental results with varying typographic parameters of the text and content area in the electronic document in accordance with one or more embodiments.
Figure 5:
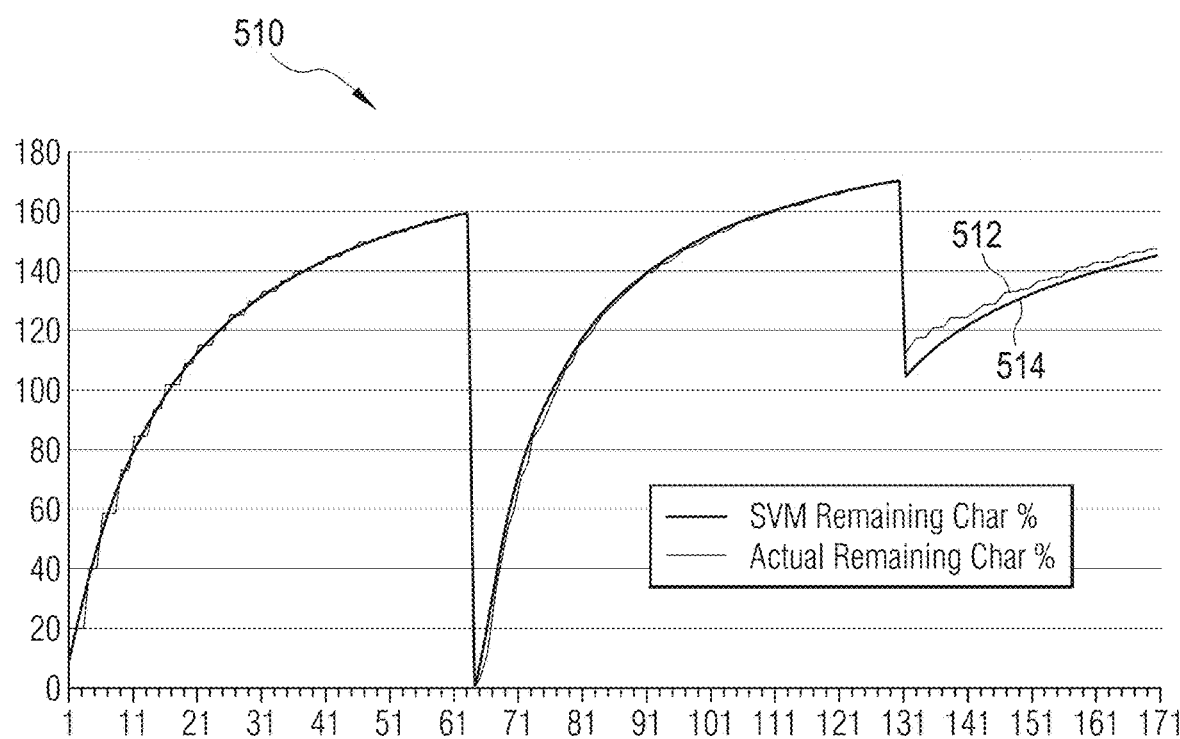

FIG. 5 illustrates an example of experimental results with varying typographic parameters of the text and content area in the electronic document in accordance with one or more embodiments. As illustrated by FIG. 5, a first chart 502 depicts a comparison of the predicted number of characters remaining 504 estimated by the trained support vector machine and a ground truth number of characters remaining 506. The first chart includes data where fuzzing is performed on the size of the font used in the training input text. For instance, the size of the characters of the training input text are not uniform with varying levels of deviation from an average font size.

As further illustrated by FIG. 5, a second chart 510 depicts a comparison of the predicted number of characters remaining 514 estimated by the trained support vector machine and a ground truth number of characters remaining 512. The second chart includes data where fuzzing is performed on a height of the content area used for training input text. For instance, the height of content areas of the training input text are not uniform with varying content area heights between characters in the same line or in adjacent lines.

Figure 6:
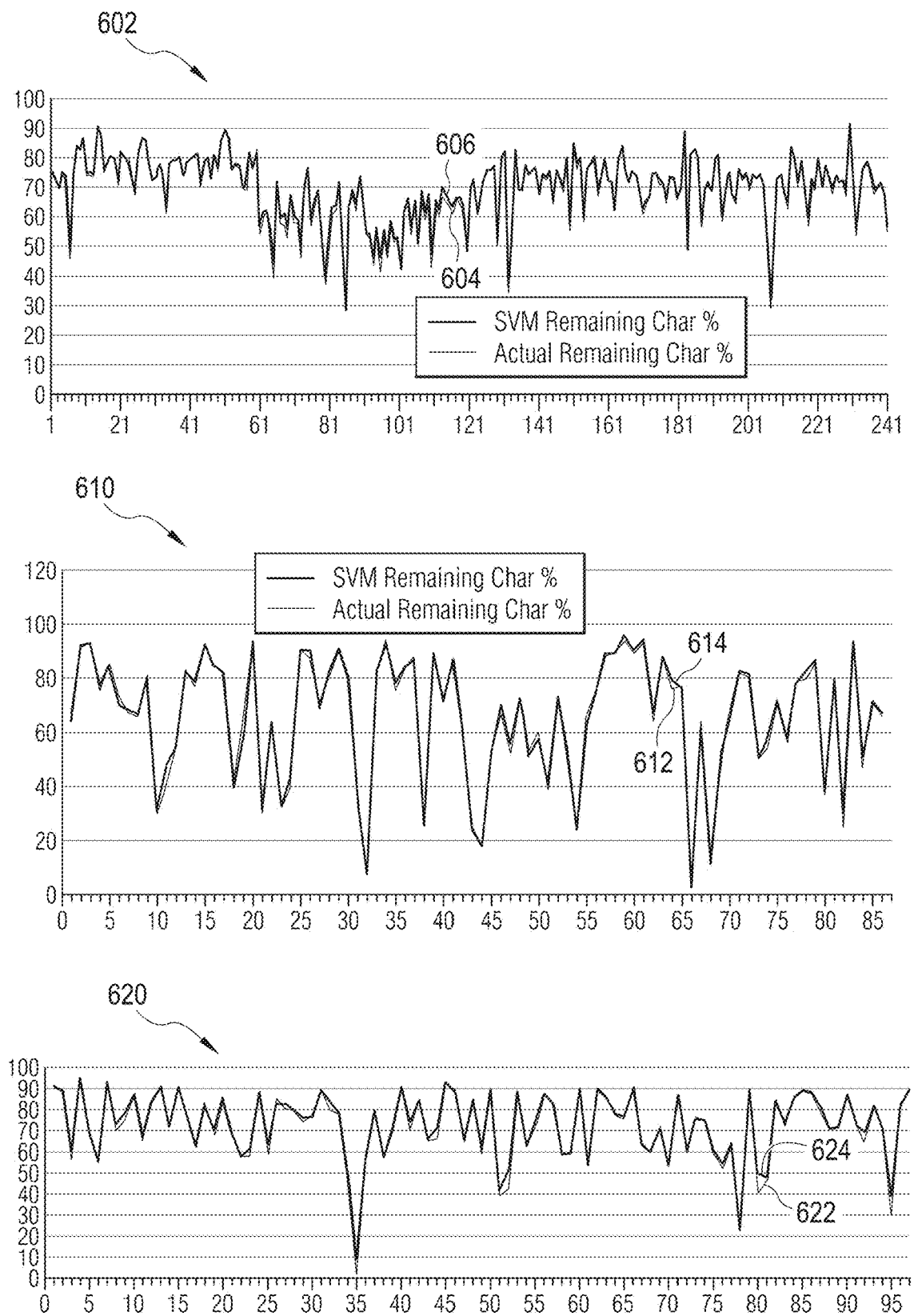
FIG. 6 illustrates another additional example of experimental results with varying typographic parameters of the text and content area in the electronic document in accordance with one or more embodiments.

FIG. 6 illustrates an additional example of experimental results with varying typographic parameters of the text and content area in the electronic document in accordance with one or more embodiments. As illustrated by FIG. 6, a first chart 602 depicts a comparison of the predicted number of characters remaining 606 estimated by the trained support vector machine and a ground truth number of characters remaining 604. The first chart includes data where fuzzing is performed on the typeface used in the training input text. For instance, the visual appearance of the training input text includes varying visual appearances that differ between characters or lines.

As further illustrated by FIG. 6, a second chart 610 depicts a comparison of the predicted number of characters remaining 614 estimated by the trained support vector machine and a ground truth number of characters remaining 612. The second chart includes data where a content area includes more than one font within the content area. For instance, the font is varied within a single content area such as a custom designed font provided via the user interface.

As further illustrated by FIG. 6, a third chart 620 depicts a comparison of the predicted number of characters remaining 624 estimated by the trained support vector machine and a ground truth number of characters remaining 622. The third chart includes data where the input text includes multiple fonts in a content area (as described regarding second chart 610) and one more line breaks within the input text.

Figure 7:
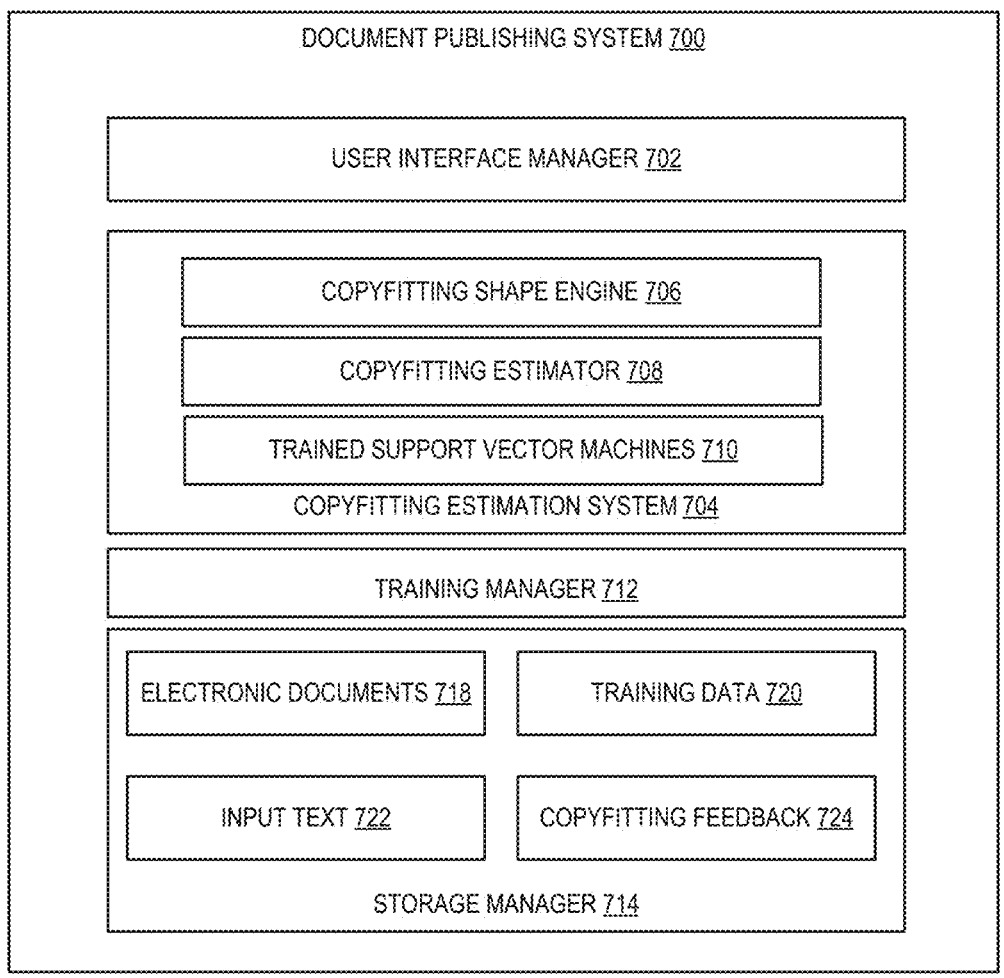
FIG. 7 illustrates a schematic diagram of a document publication system in accordance with one or more embodiments.

FIG. 7 illustrates a schematic diagram of document publishing system 700 (e.g., "document publication system 100" described above) in accordance with one or more embodiments. As shown, the document publishing system 700 may include, but is not limited to, user interface manager 702, copyfitting estimation system 704, a training manager 712, and storage manager 714. The copyfitting estimation system 704 includes a copyfitting shape engine 706, a copyfitting estimator 708, and trained support vector machines 710. The storage manager 714 includes electronic documents 718, training data 520, input text 522, and copyfitting feedback 524.

As illustrated in FIG. 7, the document publishing system 700 includes a user interface manager 702. For example, the user interface manager 702 allows users to provide electronic documents to the document publishing system 700. In some embodiments, the user interface manager 702 provides a user interface through which the user can upload the electronic documents 718 which represent the electronic document including content areas for inserting input text, as discussed above. Alternatively or additionally, the user interface may enable the user to download the electronic document from a local or remote storage location (e.g., by providing an address (e.g., a URL or other endpoint) associated with an electronic document).

Additionally, the user interface manager 702 allows users to request the document publishing system 700 to insert input text into one or more content areas of the electronic documents 718. For example, where the electronic document includes a plurality content areas, the user can request that the document management system insert one or more characters into a selected content area. The user interface manager 702 allows users to view, such as by a presentation device copyfitting feedback generated by the copyfitting estimation system 704 as described above.

As illustrated in FIG. 7, the document publishing system 700 includes a copyfitting estimation system 704. The copyfitting estimation system 704 can receive an electronic document including content areas and receive input text from a user. For example, as discussed above, the copyfitting estimation system can compute a number of remaining characters available for input to a selected content area using the input text. The copyfitting estimation system 704 presents copyfitting feedback in real-time as additional input text is received.

As illustrated in FIG. 7, the copyfitting estimation system 704 includes a copyfitting shape engine 706. The copyfitting shape engine 706 classifies the shape of the content area. A comparison between the content area to a database of existing shapes is performed by the copyfitting shape engine 706 to match an existing shape to the content area. In some embodiments, the copyfitting shape engine determines a similarity between the content area and one or more existing shapes and selects an existing shape that is the most similar to the content area.

As illustrated in FIG. 7, the copyfitting estimation system 704 includes a copyfitting estimator 708. The copyfitting estimator 708 computes a number of remaining characters in the content area using the set of weights generated by the trained support vector machines 710 and the input text. For instance, as characters are input to the user interface of user interface manager 702, the copyfitting estimator 708 applies the weights to typography parameters of the input text. By applying the set of weights to the typographic parameters of the input text, a number of remaining characters, words, or lines available for additional text in the content area is computed.

As illustrated in FIG. 7, the copyfitting estimation system 704 includes trained support vector machines 710. The trained support vector machines 710 receive input parameters such as area covered by input text, total area of the content area, total with of characters in the input text, a number of characters in the input text, a number of words in the input text, a height of the shape, a minimum width of the shape, and a maximum width of the shape. The trained support vector machines 710 generate a set of weights for typographic parameters based on a training process of tagged data that trains the support vector machines 710 to classify a content area as underfit or overfit.

As illustrated in FIG. 7, the document publishing system 700 includes a training manager 712 can teach, guide, tune, and/or train one or more support vector machines. In particular, the training manager 712 can train a support vector machine based on a plurality of training data (e.g., training data 720). As discussed, the training data 720 may include training content areas, training input text, and ground truth input text character count, such as from a library of shape and input text data. In some embodiments, the training manager 712 can access, identify, generate, create, and/or determine training input and utilize the training input to train and fine-tune the support vector machines. For instance, the training manager 712 can train the trained support vector machines 710 as discussed above.

As illustrated in FIG. 7, the document publishing system 700 also includes the storage manager 714. The storage manager 714 maintains data for the document publishing system 700. The storage manager 714 can maintain data of any type, size, or kind as necessary to perform the functions of the document publishing system 700. The storage manager 714, as shown in FIG. 7, includes the electronic documents 718. The electronic documents 518 can include a content area for inserting input text, as discussed in additional detail above.

As further illustrated in FIG. 7, the storage manager 714 also includes training data 520. Training data 520 can include training input text or training content areas for use by the training manager 712 to train the support vector machines. For example, training data 720 includes a set of text content of varying lengths, fonts, and visual appearances. The training data also includes various existing shapes of content areas, such as content areas that are extracted from the electronic documents 718. The storage manager 714 may also include input text 522. The input text 522 may include a stream of characters, words, or lines of text that are received from the user interface manager 702 for insertion into the content area. The storage manager 714 may further include copyfitting feedback 524. The copyfitting feedback 524 may correspond to a combination of input text and a content area, the copyfitting feedback including a number of remaining characters, words, lines, or an indication of an underfit or overfit condition for the content area.

Each of the components 702-714 of the document publishing system 700 and their corresponding elements (as shown in FIG. 7) may be in communication with one another using any suitable communication technologies. It will be recognized that although components 702-714 and their corresponding elements are shown to be separate in FIG. 7, any of components 702-714 and their corresponding elements may be combined into fewer components, such as into a single facility or module, divided into more components, or configured into different components that may serve a particular embodiment.

The components 702-714 and their corresponding elements can comprise software, hardware, or both. For example, the components 702-714 and their corresponding elements can comprise one or more instructions stored on a computer-readable storage medium and executable by processors of one or more computing devices. When executed by the one or more processors, the computer-executable instructions of the document publishing system 700 can cause a client device and/or a server device to perform the methods described herein. Alternatively, the components 702-714 and their corresponding elements can comprise hardware, such as a special purpose processing device to perform a certain function or group of functions. Additionally, the components 702-714 and their corresponding elements can comprise a combination of computer-executable instructions and hardware.

Furthermore, the components 702-714 of the document publishing system 700 may, for example, be implemented as one or more stand-alone applications, as one or more modules of an application, as one or more plug-ins, as one or more library functions or functions that may be called by other applications, and/or as a cloud-computing model. Thus, the components 702-714 of the document publishing system 700 may be implemented as a stand-alone application, such as a desktop or mobile application. Furthermore, the components 702-714 of the document publishing system 700 may be implemented as one or more web-based applications hosted on a remote server. Alternatively, or additionally, the components of the document publishing system 700 may be implemented in a suit of mobile device applications or "apps."

Figure 8:
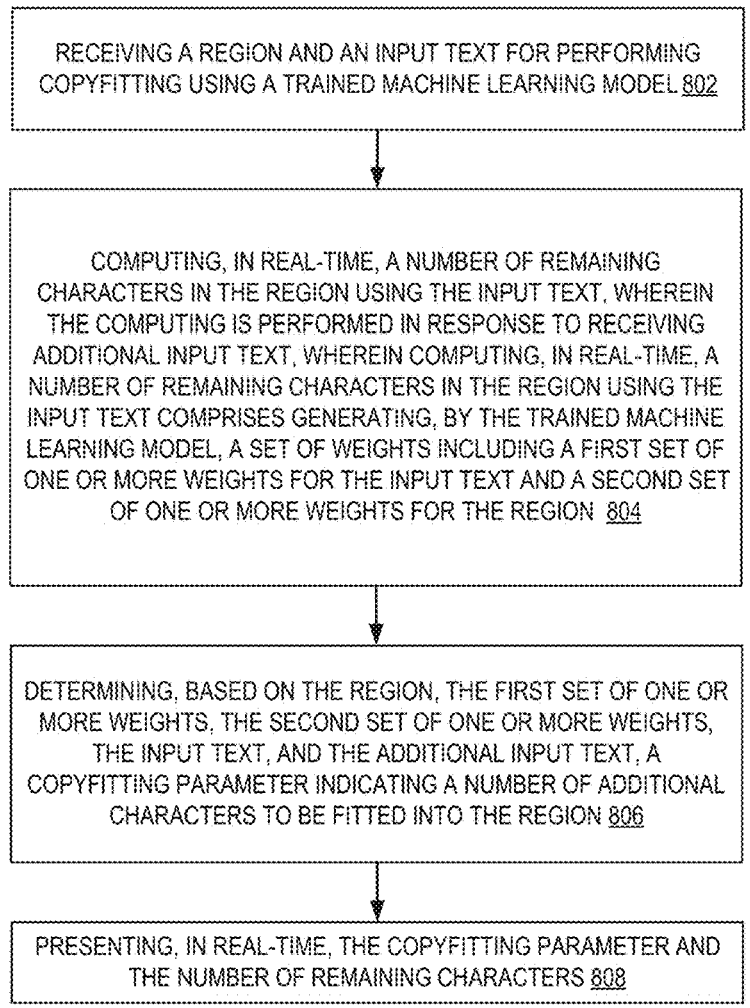
FIG. 8 illustrates a flowchart of a series of acts in a method of real-time copyfitting including inserting input text and presenting a number of remaining characters in electronic documents in accordance with one or more embodiments.

FIGS. 1-7, the corresponding text, and the examples, provide a number of different systems and devices that allows a user to insert text into content areas of electronic documents and receive real-time copyfitting feedback including the number of remaining characters available to insert into a selected content area. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of insert input text into a selected content area of the electronic documents from electronic documents in accordance with one or more embodiments. In one or more embodiments, the method 800 is performed in a digital medium environment that includes the document publishing system 700. The method 800 is intended to be illustrative of one or more methods in accordance with the present disclosure and is not intended to limit potential embodiments.

Alternative embodiments can include additional, fewer, or different steps than those articulated in FIG. 8.

As illustrated in FIG. 8, the method 800 includes an act 802 of receiving a content area and an input text for performing copyfitting using a trained support vector machine. For example, a user input includes a content area that defines a content area and an input text. The content area is a content area defined by a minimum content area height, a maximum content area height, a content area width, and a content area that has been selected for editing by the user. The input text is a set of letters or characters that are input by the user that includes a number of characters, an area covered by the input text, and a width of the input text, wherein each character has a font, a character height, and a character width.

As illustrated in FIG. 8, the method 800 includes an act 804 of computing, in real-time, a number of remaining characters in the content area using the input text, wherein the computing is performed in response to receiving additional input text, wherein computing, in real-time, a number of remaining characters in the content area using the input text comprises generating, by the trained support vector machine, a set of weights including a first set of one or more weights for the input text and a second set of one or more weights for the content area. To compute the number of remaining characters, a first set of one or more weights for the input text and a second set of one or more weights for the content area is generated by a trained support vector machine. The first set of one or more weights to the number of characters, a number of words in the input text, a width of the input text, an average width of a character, and a line height. The second set of one or more weights to the minimum content area height, the maximum content area height, the content area width, or the content area. After the weights are applied, the remaining number of characters, words, and lines can be computed as described above.

As illustrated in FIG. 8, the method 800 includes an act 806 of determining, based on the content area, the first set of one or more weights, the second set of one or more weights, the input text, and the additional input text, a copyfitting parameter indicating a number of additional characters to be fitted into the content area. After the weights are applied at act 804, the remaining number of characters, words, and lines can be computed. The number of remaining characters represents an additional number of characters than can fit into the content area without overfitting the content area.

As illustrated in FIG. 8, the method 800 includes an act 808 of presenting, in real-time, the copyfitting parameter and the number of remaining characters. As described above, copyfitting feedback is provided to the user interface, in real-time as input text is being received and inserted into the content area. In some embodiments, the copyfitting feedback indicates an underfit or overfit condition of the content area and the number of remaining characters, words, or lines available in the content area as described above.

Figure 9:
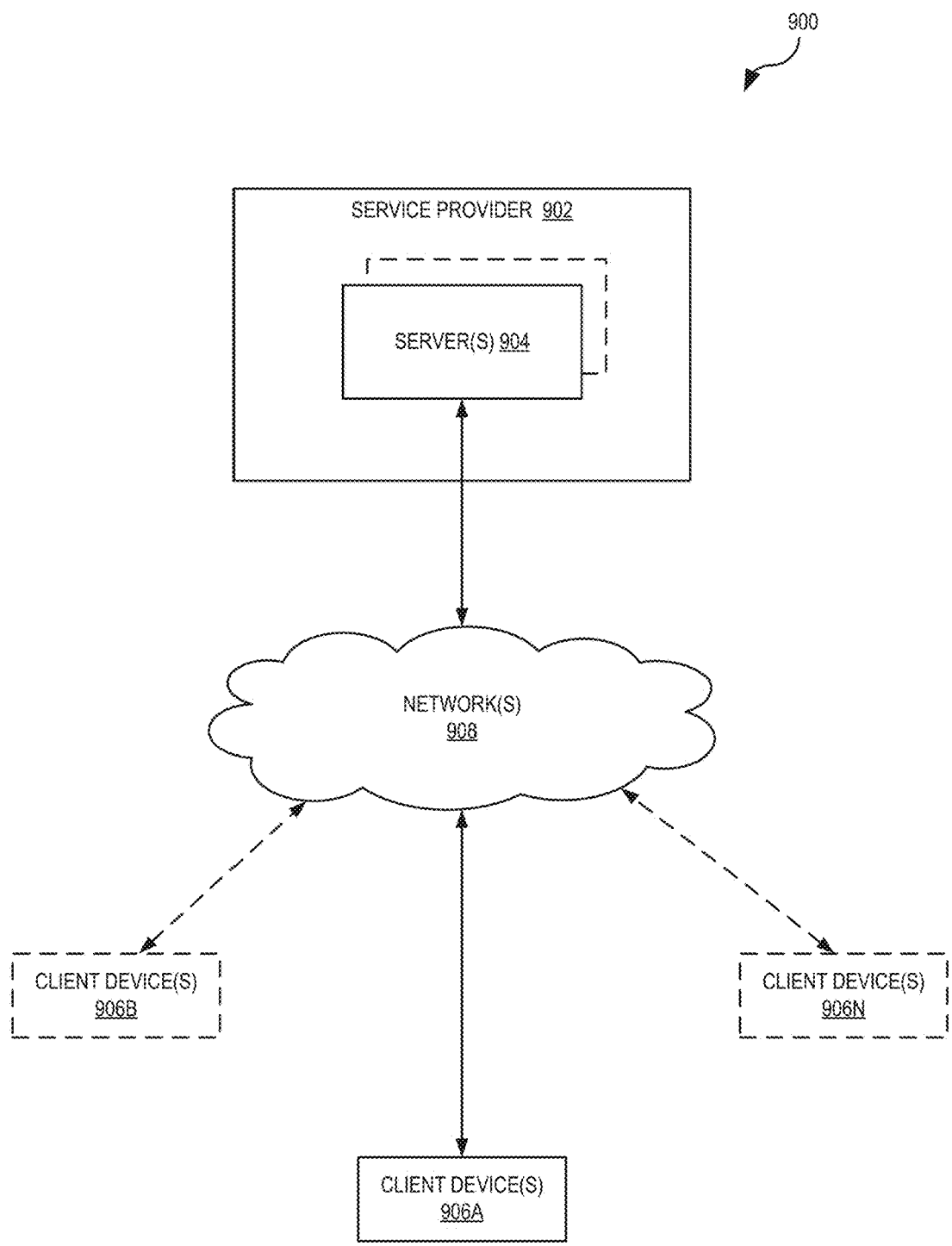
FIG. 9 illustrates a schematic diagram of an exemplary environment in which the document management system can operate in accordance with one or more embodiments.

FIG. 9 illustrates a schematic diagram of an exemplary environment 900 in which the copyfitting estimation system 700 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the document publishing system 700. In particular, the document publishing system 700 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa. The one or more networks 908 will be discussed in more detail below with regard to FIG. 10.

In addition, the environment 900 may also include one or more servers 904. The one or more servers 904 may generate, store, receive, and transmit any type of data, including electronic documents 718, training data 720, input text 722, copyfitting feedback 524, or other information. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the document publishing system 700. In particular, the document publishing system 700 can comprise an application running on the one or more servers 904 or a portion of the document publishing system 700 can be downloaded from the one or more servers 904. For example, the document publishing system 700 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 can provide access to one or more electronic documents (e.g., the electronic documents 718) stored at the one or more servers 904. Moreover, the client device 906A can receive a request (i.e., via user input) to insert input text into a selected content area of the electronic documents and provide the request to the one or more servers 904. Upon receiving the request, the one or more servers 904 can automatically perform the methods and processes described above to insert input text into a selected content area of the electronic documents. The one or more servers 904 can provide all or portions of one or more output electronic documents, to the client device 906A for display to the user.

As just described, the document publishing system 700 may be implemented in whole, or in part, by the individual elements 902-908 of the environment 900. It will be appreciated that although certain components of the document publishing system 700 are described in the previous examples with regards to particular elements of the environment 900, various alternative implementations are possible. For instance, in one or more embodiments, the document publishing system 700 is implemented on any of the client devices 906A-N. Similarly, in one or more embodiments, the document publishing system 700 may be implemented on the one or more servers 904. Moreover, different components and functions of the document publishing system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, main content area computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, that both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
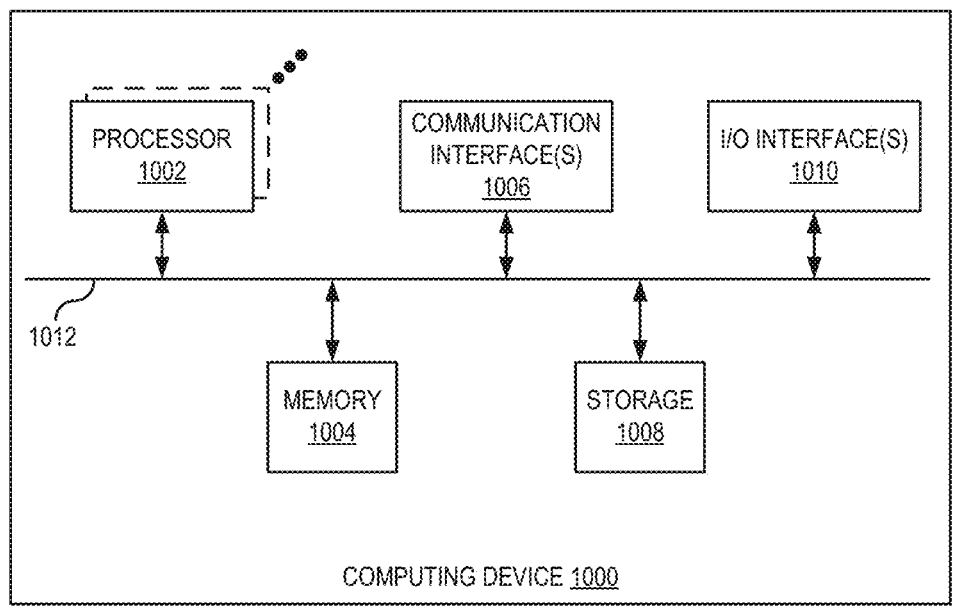
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the document management system. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 which includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination of these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a content area of an electronic document and input text for copyfitting into the content area;
   classifying, by a trained classifier, a shape of the content area;
   generating a set of weights based on the classified shape of the content area, the set of weights including a first set of one or more weights for the input text and a second set of one or more weights for the content area;
   determining copyfitting parameters for the content area based on content area features, the first set of one or more weights, the second set of one or more weights, and the input text, the copyfitting parameters including an indication of a number of remaining characters that can be inserted into the content area; and
   presenting, in real-time, the copyfitting parameters.

2. The method of claim 1, wherein the content area features include a minimum content area height, a maximum content area height, a content area width, and an area inside the content area.

3. The method of claim 2, wherein input text includes a number of characters, an area covered by the input text, and a width of the input text, wherein each character has a font, a character height, and a character width.

4. The method of claim 3, wherein determining the copyfitting parameters for the content area comprises:
   applying the first set of one or more weights to the number of characters, a number of words in the input text, a width of the input text, an average width of a character, and a line height; and
   applying the second set of one or more weights to the minimum content area height, the maximum content area height, the content area width, or the content area.

5. The method of claim 1, wherein the first set of one or more weights for the input text comprises a weight for one or more of a number of characters in an input text, a number of words in the input text, an area covered by the input text, or a sum of the widths of characters in the input text.

6. The method of claim 1, wherein the second set of one or more weights for the content area comprises a weight for one or more of a minimum width of a content area, a maximum width of the content area, a content area height, or area of the content area.

7. The method of claim 1, wherein the copyfitting parameters further indicate a number of additional words or lines that can be inserted into the content area.

8. A system comprising:
   a memory component; and
   a processing device coupled to the memory component, the processing device to perform operations comprising:
   receiving a content area of an electronic document and input text for copyfitting into the content area;
   classifying, by a trained classifier, a shape of the content area;
   generating a set of weights based on the classified shape of the content area, the set of weights including a first set of one or more weights for the input text and a second set of one or more weights for the content area;
   determining copyfitting parameters for the content area based on content area features, the first set of one or more weights, the second set of one or more weights, and the input text, the copyfitting parameters including an indication of a number of remaining characters that can be inserted into the content area; and
   presenting, in real-time, the copyfitting parameters.

9. The system of claim 8, wherein the content area features include a minimum content area height, a maximum content area height, a content area width, and an area inside the content area.

10. The system of claim 9, wherein input text includes a number of characters, an area covered by the input text, and a width of the input text, wherein each character has a font, a character height, and a character width.

11. The system of claim 10, wherein the operation of determining the copyfitting parameters for the content area causes the processing device to perform operations comprising:
    applying the first set of one or more weights to the number of characters, a number of words in the input text, a width of the input text, an average width of a character, and a line height; and
    applying the second set of one or more weights to the minimum content area height, the maximum content area height, the content area width, or the content area.

12. The system of claim 8, wherein the first set of one or more weights for the input text comprises a weight for one or more of a number of characters in an input text, a number of words in the input text, an area covered by the input text, or a sum of the widths of characters in the input text.

13. The system of claim 8, wherein the second set of one or more weights for the content area comprises a weight for one or more of a minimum width of a content area, a maximum width of the content area, a content area height, or area of the content area.

14. The system of claim 8, wherein the copyfitting parameters further indicate a number of additional words or lines that can be inserted into the content area.

15. A method comprising:
    receiving training data that includes a shape of a content area, and input text, and a copyfitting label; and
    training a classifier using the training data to:
    classify a shape of the content areas to identify a matching content area shape,
    generate a set of weights based on the classified shape of the content area, and
    generate copyfitting parameters including a predicted number of remaining characters in the content area based on the input text, content area features, and the set of weights.

16. The method of claim 15, wherein the copyfitting label indicates an overfit, an underfit, or a proper fit of the input text to the content area.

17. The method of claim 16, wherein training the classifier using the training data comprises:
- inserting the input text into the shape of content area;
- generating the copyfitting parameters; and
- comparing the copyfitting parameters with the copyfitting label.

18. The method of claim 17, wherein the copyfitting label is a ground truth condition indicating an overfit or an underfit of the input text in the content area.

19. The method of claim 17 further comprising generating, using the comparison of the copyfitting parameters and the copyfitting label, a first set of weights for the input text by assigning a weight to a number of words in the input text, an area covered by the input text, and a sum of the widths of characters in the input text.

20. The method of claim 17 further comprising generating, using the comparison of the copyfitting parameters and the copyfitting label, a second set of one or more weights for the content area comprises a weight for one or more of a minimum width of a content area, a maximum width of the content area, a content area height, and an area of the content area.

* * * * *